United States Patent
Noda

(10) Patent No.: US 9,532,574 B2
(45) Date of Patent: Jan. 3, 2017

(54) KNEADED DOUGH DIVIDING APPARATUS

(71) Applicant: OSHIKIRI MACHINERY LTD., Kanagawa (JP)

(72) Inventor: Hiroshi Noda, Kanagawa (JP)

(73) Assignee: OSHIKIRI MACHINERY LTD., Kanagawa (JP)

( * ) Notice: Subject to any disclaimer, the term of this patent is extended or adjusted under 35 U.S.C. 154(b) by 120 days.

(21) Appl. No.: 14/679,097

(22) Filed: Apr. 6, 2015

(65) Prior Publication Data

US 2015/0282493 A1    Oct. 8, 2015

(30) Foreign Application Priority Data

Apr. 7, 2014  (JP) ................................. 2014-078365

(51) Int. Cl.
*A21C 5/00* (2006.01)
*A21C 11/16* (2006.01)

(52) U.S. Cl.
CPC ................. *A21C 5/00* (2013.01); *A21C 5/003* (2013.01); *A21C 11/16* (2013.01)

(58) Field of Classification Search
CPC ............ A21C 5/003; A21C 11/16; A21C 5/00
USPC ............................ 425/96, 113, 133; 426/503
See application file for complete search history.

(56) References Cited

U.S. PATENT DOCUMENTS

| 4,322,202 A | 3/1982 | Martinez |
| 8,071,149 B2 * | 12/2011 | Campbell ............... A21C 11/16 425/311 |
| 8,387,521 B2 | 3/2013 | Oki et al. |
| 8,424,452 B2 | 4/2013 | Oki et al. |

* cited by examiner

*Primary Examiner* — Joseph S. Del Sole
*Assistant Examiner* — Thukhanh T Nguyen
(74) *Attorney, Agent, or Firm* — Wenderoth, Lind & Ponack, L.L.P.

(57) ABSTRACT

Provided is a kneaded dough dividing apparatus including a divider having a single dough inlet receiving kneaded dough and two dough outlets for discharging the received kneaded dough as two streams of kneaded dough. The apparatus includes a dough supply pipe continuously supplying kneaded dough to the dough inlet of the divider, and a pressure distribution changing plate provided in the dough supply pipe. The pressure distribution changing plate having a width in a direction traversing a cross-section of the dough supply pipe as seen in the cross-section and a length extending from an upstream end to downstream end of the pressure distribution changing plate. The pressure distribution changing plate is twisted so that a direction of the width at the downstream end is generally at a right angle to a direction of the width at the upstream end.

6 Claims, 3 Drawing Sheets

KNEADED DOUGH DIVIDING APPARATUS

FIELD OF THE INVENTION

The present invention relates to a kneaded dough dividing apparatus dividing and delivering continuously supplied kneaded dough as a plurality of streams of kneaded dough.

BACKGROUND OF THE INVENTION

In the production of bread, a mass of kneaded dough is prepared in a mixer, and the mass of kneaded dough is extruded as a continuous stream of kneaded dough by a pump and divided into a plurality of streams of kneaded dough through a kneaded dough dividing apparatus. Thereafter, each stream of kneaded dough is divided into small pieces necessary for bread baking.

A kneaded dough dividing apparatus is disclosed in U.S. Pat. No. 8,387,521. The kneaded dough dividing apparatus includes a divider having a dough inlet receiving one continuous stream of kneaded dough discharged from a horizontally extending screw extruder (pump) communicated with an opening at the lower end of a hopper receiving the above-described mass of kneaded dough. The divider discharges the received kneaded dough as two continuous streams of kneaded dough from two dough outlets positioned in bilateral symmetry at the downstream side of the dough inlet. A similar divider is connected at a dough inlet thereof to each of the two dough outlets of the first-mentioned divider. In this way, dividers are connected successively from the upstream side toward the downstream side to produce a required number of streams of kneaded dough. Each divider has an outlet control member adjusting the respective opening areas of the two dough outlets. The outlet control member reduces the opening area of one of the two dough outlets when enlarging the opening area of the other of the two dough outlets and reduces the opening area of the other dough outlet when enlarging the opening area of the one dough outlet, thereby allowing the total amount of kneaded dough discharged from the divider to be kept substantially constant, and hence enabling the pressure in the divider to be kept substantially constant, and thus allowing the quality of kneaded dough discharged from the divider to be kept constant.

However, it has been found that the kneaded dough dividing apparatus having the above-described divider is not necessarily satisfactory in terms of the quality of dough discharged therefrom from the viewpoint of obtaining dough of even more ideally uniform quality. That is, it has been found that the quality of kneaded dough is somewhat different for each dough outlet of the dough dividing apparatus discharging the dough. The quality of kneaded dough is considered to depend on various factors acting on the kneaded dough in the kneaded dough passage from the discharge from the screw extruder to the discharge from the dough outlets of the kneaded dough dividing apparatus. Therefore, it has been difficult to determine the cause of nonuniformity in quality of kneaded dough. In this regard, the present inventors have conducted various studies and, as a result, found that the cause of the quality nonuniformity of kneaded dough is the internal pressure conditions in the kneaded dough when extruded from the screw extruder. That is, kneaded dough is supplied from the hopper to the screw extruder, transferred rectilinearly through the screw extruder and extruded from an outlet directed at right angles to the transfer direction. Immediately before being extruded from the outlet, the kneaded dough, which has been transferred rectilinearly so far, is pressed against the terminating end surface of the screw extruder, and then turned at a right angle before being discharged from the outlet. Accordingly, the kneaded dough pressed against the terminating end surface is subjected to a high pressure, and the pressure applied to the kneaded dough decreases as the distance from the terminating end surface increases toward the hopper. Consequently, kneaded dough extruded from the outlet in the form of a laminar flow has a pressure gradient in a horizontal direction as seen in a cross-section thereof. When such kneaded dough is received into the divider and discharged from the two dough outlets, being divided into right and left streams of kneaded dough, a difference is made between the internal pressures of the two streams of kneaded dough discharged from the dough outlets. The present inventors have found that the above-described pressure difference has an effect on the quality of each stream of kneaded dough discharged from the kneaded dough dividing apparatus.

SUMMARY OF THE INVENTION

An object of the present invention is to provide a kneaded dough dividing apparatus corrected for the above-described pressure gradient to homogenize the quality of streams of kneaded dough discharged from the dough outlets of the kneaded dough dividing apparatus.

That is, the present invention provides a kneaded dough dividing apparatus including a divider having a single dough inlet receiving kneaded dough and a plurality of dough outlets for discharging the received kneaded dough as a plurality of streams of kneaded dough, and a dough supply pipe continuously supplying kneaded dough to the dough inlet of the divider. The kneaded dough dividing apparatus further includes a pressure distribution changing plate provided in the dough supply pipe and having a width in a direction traversing a cross-section of the dough supply pipe as seen in the cross-section and a length extending from an upstream end to downstream end of the pressure distribution changing plate. The pressure distribution changing plate is twisted as it extends from the upstream end to the downstream end so that the direction of the width at the downstream end is at an angle in the range of from 70° to 110° to the direction of the width at the upstream end.

Preferably, the angle of twist of the pressure distribution changing plate between the upstream end and the downstream end is in the range of from 80° to 100°, more preferably at approximately 100°.

In the kneaded dough dividing apparatus according to the present invention, kneaded dough supplied into the dough supply pipe is twisted in accordance with the twist of the pressure distribution changing plate as it advances downstream toward the divider. Therefore, appropriately setting the twist angle makes it possible to appropriately orient kneaded dough as supplied to the dough inlet of the divider.

Specifically, the arrangement may be as follows. The divider has two dough outlets, and the two dough outlets are positioned in bilateral symmetry with respect to a stream of kneaded dough entering the divider from the dough inlet. In addition, the direction of the width of the pressure distribution changing plate at the upstream end is substantially vertical.

DETAILED DESCRIPTION OF THE INVENTION

An embodiment of a kneaded dough dividing apparatus according to the present invention will be explained below with reference to the accompanying drawings.

Figure 1:
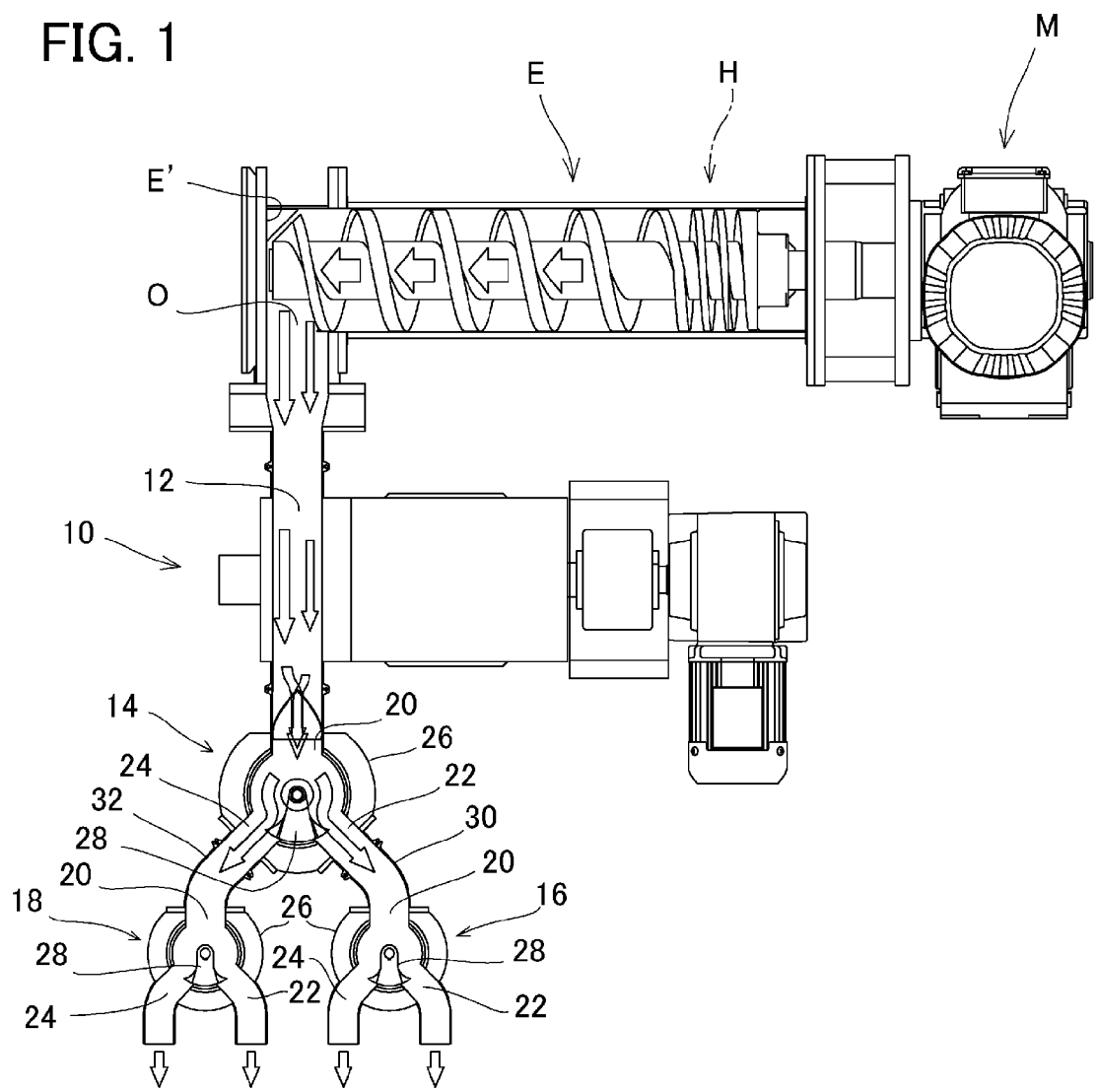
FIG. 1 is a diagram illustrating the basic structure of a kneaded dough dividing apparatus according to the present invention, in which main constituent members are shown in sectional view, and in which the size of each arrow roughly represents the magnitude of internal pressure in kneaded dough.
Figure 2:
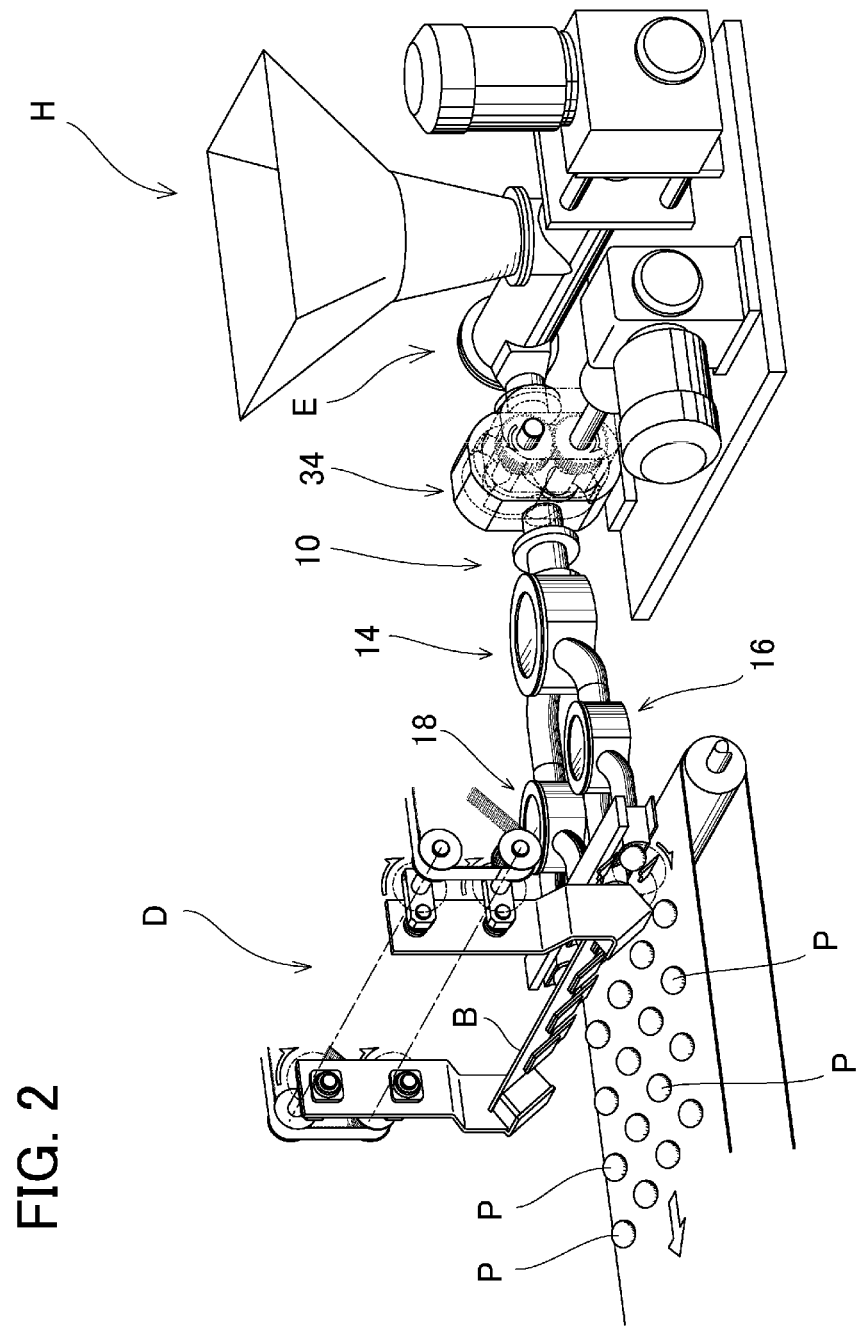
FIG. 2 is a perspective view showing the overall structure of a bread dough forming machine having the apparatus shown in FIG. 1.

FIGS. 1 and 2 schematically show the structure of a kneaded dough dividing apparatus 10 according to the present invention. The kneaded dough dividing apparatus 10 has a dough supply pipe 12 receiving kneaded dough sent through a hopper H (FIG. 2) and a screw extruder E (rotationally driven by a motor M), which are provided at the upstream side of the dough supply pipe 12. The kneaded dough dividing apparatus 10 further has a first divider 14 receiving kneaded dough from the dough supply pipe 12 and discharging two streams of kneaded dough. In the illustrated example, the kneaded dough dividing apparatus 10 further has second and third dividers 16 and 18 each receiving kneaded dough divided by the first divider 14 and discharging two streams of kneaded dough. Thus, the kneaded dough dividing apparatus 10 divides kneaded dough into four streams of kneaded dough. As shown in FIG. 2, each stream of kneaded dough discharged from the kneaded dough dividing apparatus 10 is divided by a dividing device D with a rotationally driven blade B into small pieces P each corresponding to one bread product to be baked. Regarding the dividing device D, U.S. Pat. No. 8,424,452 is incorporated herein by reference.

The first to third dividers 14, 16 and 18 have the same basic structure. Specifically, these dividers each have a divider vessel body 26 having one dough inlet 20 receiving continuously supplied kneaded dough and two dough outlets 22 and 24 for discharging the kneaded dough as two streams of kneaded dough. Each divider further has a fan-shaped outlet control member 28 provided in the divider vessel body 26. The dough outlets 22 and 24 of the first divider 14 are connected to the dough inlets 20 of the second and third dividers 16 and 18 through first and second dough feed pipes 30 and 32, respectively. The structure of the dividers 14, 16 and 18 is detailed in the above-mentioned U.S. Pat. No. 8,387,521; therefore, a detailed explanation thereof is omitted herein.

Figure 3:
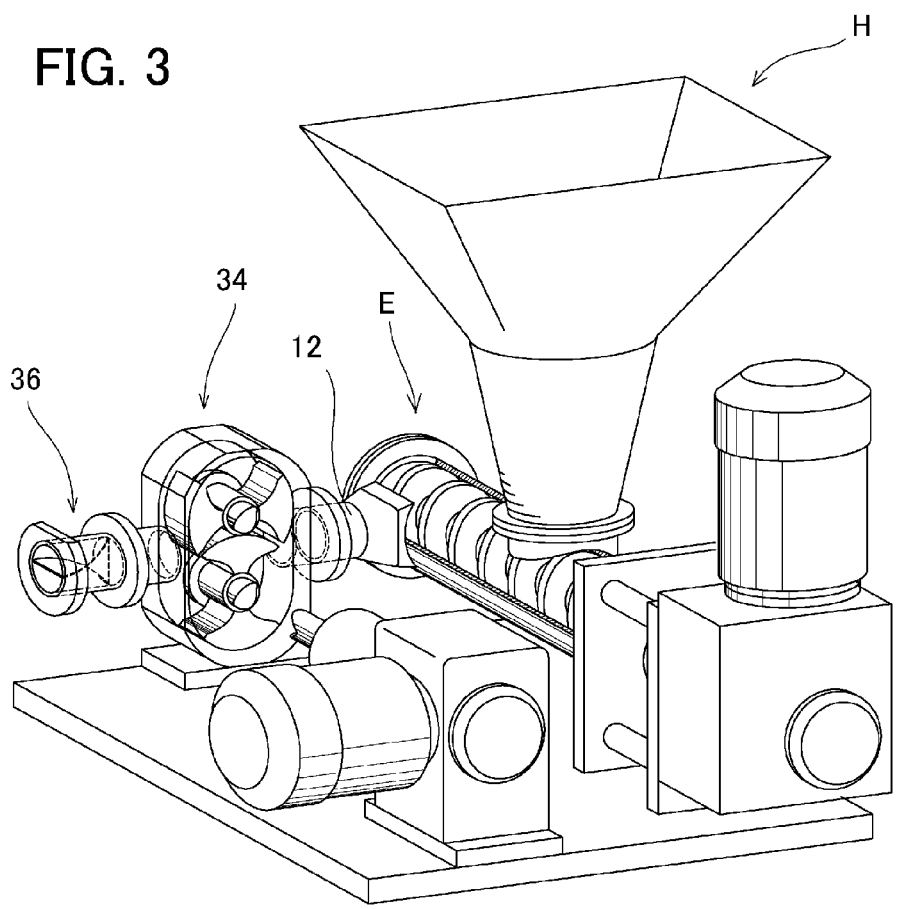
FIG. 3 is a perspective view showing a part of the apparatus in FIG. 1 that transfers bread dough to a dough divider of the apparatus, in which main constituent elements are shown in transparent view.

As shown in FIG. 3, the dough supply pipe 12 is provided with a metering pump 34 to allow kneaded dough extruded from the screw extruder E into the dough supply pipe 12 to be drivingly supplied toward the first divider 14. As has been stated above, kneaded dough supplied from the hopper H to the screw extruder E is sent to the terminating end (left end as seen in FIG. 1) of the screw extruder E and extruded into the dough supply pipe 12 from an outlet O provided at the terminating end after the direction of flow thereof has been changed through 90°. Accordingly, immediately before being extruded, kneaded dough is pressed against a terminating end wall E' of the screw extruder E. Accordingly, a high pressure is applied to the portion of kneaded dough that is pressed directly against the terminating end wall E', and the pressure decreases as the distance from the terminating end wall E' increases toward the hopper H. Consequently, although the kneaded dough is extruded from the outlet O of the screw extruder E into the dough supply pipe 12 in the form of a laminar flow, the extruded kneaded dough has a pressure gradient in a horizontal direction as seen in a cross-section thereof (i.e. a gradient in which the internal pressure of dough decreases from the left side toward the right side as the dough supply pipe 12 is seen from the first divider 14 side toward the terminating end of the screw extruder E). In FIG. 1, such a difference in internal pressure of the kneaded dough is represented by the length of the arrows in FIG. 1. The horizontal pressure gradient is left in the kneaded dough even after the kneaded dough has been sent to the downstream side through the metering pump 34. If the kneaded dough with such a pressure gradient is received into the first divider 14 and divided and discharged through the right and left dough outlets 22 and 24, kneaded dough discharged from the dough outlet 24, undesirably, has a higher internal pressure than kneaded dough discharged from the dough outlet 22.

Figure 4:
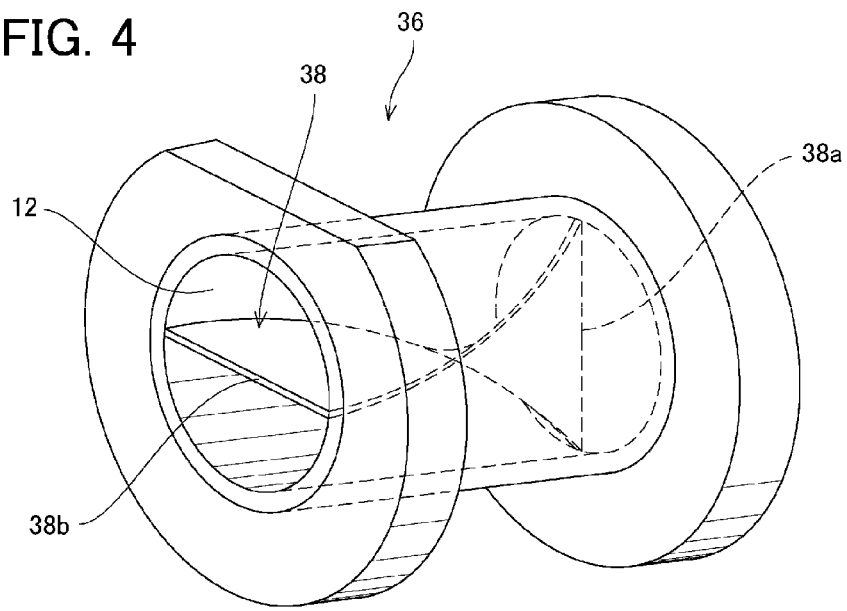
FIG. 4 is a perspective view showing a pressure distribution changing device in the apparatus shown in FIG. 1.

The present invention aims at correcting the above-described pressure gradient of kneaded dough in the dough supply pipe 12 before sending the kneaded dough to the first divider 14, thereby eliminating the above-described disadvantage. That is, in the kneaded dough dividing apparatus 10 according to the present invention, a pressure distribution changing device 36 is provided in the dough supply pipe 12 (at a position downstream the metering pump 34 in the example shown in FIG. 3). The pressure distribution changing device 36, as shown in FIGS. 3 and 4, has a pressure distribution changing plate 38 that has a width in a direction traversing a cross-section of the dough supply pipe 12 as seen in the cross-section and a length extending from an upstream end 38a to a downstream end 38b. The pressure distribution changing plate 38 is twisted as it extends from the upstream end 38a to the downstream end 38b. The direction of the width of the pressure distribution changing plate 38 at the upstream end 38a is substantially vertical in the diametrical direction of the dough supply pipe 12, and the direction of the width of the pressure distribution changing plate 38 at the downstream end 38b is substantially horizontal in the diametrical direction of the dough supply pipe 12. In the illustrated example, the width direction of the pressure distribution changing plate 38 at the downstream end 38b is at approximately 90° to the width direction thereof at the upstream end 38a. Accordingly, as kneaded dough supplied from the upstream side into the pressure distribution changing device 36 is advanced along the pressure distribution changing plate 38, portions of the kneaded dough that are in a horizontal (right and left) relationship to each other at the upstream end 38a of the pressure distribution changing plate 38 are brought substantially into a vertical (upper and lower) relationship, thus making it possible to change the above-described pressure gradient in the kneaded dough. According to the results of our experiments, the angle of twist of the pressure distribution changing plate 38 between the upstream end 38a and the downstream end 38b should be set in the range of from 70° to 110° to satisfactorily correct the pressure gradient in kneaded dough. The twist angle should preferably be set in the range of from 80° to 100°, most preferably at approximately 100°.

Accordingly, in the kneaded dough dividing apparatus 10, kneaded dough that is discharged from the terminating end outlet O of the screw extruder E with a pressure gradient in the horizontal direction is received into the dough supply pipe 12, where the horizontal pressure gradient is changed into a pressure gradient in the vertical direction by the pressure distribution changing plate 38. The first divider 14 receives and discharges the kneaded dough with the pressure gradient changed as stated above from the right and left dough outlets 22 and 24. Accordingly, the internal pressure conditions in two streams of kneaded dough discharged from the dough outlets 22 and 24 are generally equal or uniform to each other. It is therefore possible to improve or homogenize the quality of streams of kneaded dough discharged from the kneaded dough dividing apparatus.

Although an embodiment of the kneaded dough dividing apparatus according to the present invention has been described above, the present invention is not limited to the described embodiment but may be modified in a variety of ways. For example, the pressure distribution changing device is not limited to one that changes the pressure gradient simply by twisting kneaded dough as stated above. The pressure distribution changing device may be configured to stir kneaded dough during transfer through the dough supply pipe to level the pressure gradient, thereby making the pressure distribution uniform as a whole. Further, the pressure distribution changing device may be provided at the upstream side of the metering pump instead of at the downstream side thereof. Further, the present invention is not limited to kneaded dough dividing apparatus including a divider having two dough outlets, as stated above, but may also be applied to kneaded dough dividing apparatus including a divider having three or more dough outlets.

What is claimed is:

1. A kneaded dough dividing apparatus comprising:
    a divider having a single dough inlet receiving kneaded dough and a plurality of dough outlets for discharging the kneaded dough received as a plurality of streams of kneaded dough;
    a dough supply pipe continuously supplying kneaded dough to the dough inlet of the divider; and
    a pressure distribution changing plate provided in the dough supply pipe and having a width in a direction traversing a cross-section of the dough supply pipe as seen in the cross-section and a length extending from an upstream end to downstream end of the pressure distribution changing plate, the pressure distribution changing plate being twisted as the pressure distribution changing plate extends from the upstream end to the downstream end so that a direction of the width at the downstream end is at an angle in a range of from 70° to 110° to a direction of the width at the upstream end.

2. The kneaded dough dividing apparatus of claim 1, wherein an angle of twist of the pressure distribution changing plate between the upstream end and the downstream end is in a range of from 80° to 100°.

3. The kneaded dough dividing apparatus of claim 1, wherein an angle of twist of the pressure distribution changing plate between the upstream end and the downstream end is at approximately 100°.

4. The kneaded dough dividing apparatus of claim 1, wherein the divider has two dough outlets, the two dough outlets being positioned in bilateral symmetry with respect to a stream of kneaded dough entering the divider from the dough inlet; and
    wherein the direction of the width of the pressure distribution changing plate at the upstream end is substantially vertical.

5. The kneaded dough dividing apparatus of claim 2, wherein the divider has two dough outlets, the two dough outlets being positioned in bilateral symmetry with respect to a stream of kneaded dough entering the divider from the dough inlet; and
    wherein the direction of the width of the pressure distribution changing plate at the upstream end is substantially vertical.

6. The kneaded dough dividing apparatus of claim 3, wherein the divider has two dough outlets, the two dough outlets being positioned in bilateral symmetry with respect to a stream of kneaded dough entering the divider from the dough inlet; and
    wherein the direction of the width of the pressure distribution changing plate at the upstream end is substantially vertical.

* * * * *